(12) United States Patent
Narayanan et al.

(10) Patent No.: US 9,264,465 B2
(45) Date of Patent: Feb. 16, 2016

(54) SOCIAL NETWORK MEDIA SHARING WITH CLIENT LIBRARY

(71) Applicant: Microsoft Technology Licensing, LLC, Redmond, WA (US)

(72) Inventors: Raman Narayanan, Seattle, WA (US); Rajendra Vishnumurty, Hyderabad (IN); Russell Songco, Seattle, WA (US); Paresh Suthar, Austin, TX (US); Suresh Babu Velagapudi, Woodingville, WA (US); Ming Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/195,405

(22) Filed: Mar. 3, 2014

(65) Prior Publication Data

US 2014/0180913 A1 Jun. 26, 2014

Related U.S. Application Data

(63) Continuation of application No. 12/704,533, filed on Feb. 12, 2010, now Pat. No. 8,666,826.

(51) Int. Cl.
*G06Q 30/00* (2012.01)
*H04L 29/06* (2006.01)
(Continued)

(52) U.S. Cl.
CPC ........ *H04L 65/403* (2013.01); *G06F 17/30545* (2013.01); *G06Q 10/10* (2013.01); *G06Q 20/1235* (2013.01); *G06Q 30/0641* (2013.01); *G06Q 50/01* (2013.01); *G06Q 50/184* (2013.01)

(58) Field of Classification Search
CPC ... G06Q 50/01; G06Q 30/00; G06Q 30/0601; G06F 17/30893
USPC ................................. 705/26.1, 27.1; 709/271
See application file for complete search history.

(56) References Cited

U.S. PATENT DOCUMENTS

2003/0088571 A1 5/2003 Ekkel
(Continued)

FOREIGN PATENT DOCUMENTS

| CN | 1957367 A | 5/2007 |
| CN | 101523383 A | 9/2009 |

(Continued)

OTHER PUBLICATIONS

Mathes Adam, "Folksonomies—Cooperative Classification and Communication through Shared Metadata", Retrieved at<<http://www.adammathes.com/academic/computer-mediated-communication/folksonomies.pdf>>, Dec. 2004, pp. 1-13.
(Continued)

*Primary Examiner* — Brandy A Zukanovich
(74) *Attorney, Agent, or Firm* — Micah P. Goldsmith; Judy Yee; Micky Minhas

(57) ABSTRACT

Concepts and technologies are described herein for providing media content sharing. The concepts and technologies disclosed herein can be employed to share media content with a social network, even for content subject to access control mechanisms and/or copyright laws. According to various embodiments disclosed herein, media content can be shared with a social network, or the like. An application running at or in conjunction with a computer can obtain information relating to media content displayed at or accessible to the computer, format the data, and transmit the data to a social networking site or other location in a format appropriate for the site. Contents and technologies for viewing the shared content also are disclosed.

20 Claims, 9 Drawing Sheets

(51) Int. Cl.
  *G06Q 10/10* (2012.01)
  *G06Q 30/06* (2012.01)
  *G06Q 50/00* (2012.01)
  *G06Q 50/18* (2012.01)
  *G06F 17/30* (2006.01)
  *G06Q 20/12* (2012.01)

(56) References Cited

U.S. PATENT DOCUMENTS

| | | |
|---|---|---|
| 2007/0088817 A1 | 4/2007 | Li |
| 2008/0032622 A1 | 2/2008 | Kopra et al. |
| 2008/0040474 A1 | 2/2008 | Zuckerberg et al. |
| 2008/0052371 A1 | 2/2008 | Partovi et al. |
| 2008/0126294 A1 | 5/2008 | Ray et al. |
| 2008/0177860 A1 | 7/2008 | Khedouri et al. |
| 2008/0222295 A1 | 9/2008 | Robinson et al. |
| 2009/0055377 A1 | 2/2009 | Hedge et al. |
| 2009/0069911 A1 | 3/2009 | Stefik |
| 2009/0129740 A1 | 5/2009 | O'brien et al. |
| 2009/0157845 A1 | 6/2009 | Kim et al. |
| 2009/0222750 A1 | 9/2009 | Jain et al. |
| 2009/0265426 A1 | 10/2009 | Svendsen et al. |
| 2009/0313369 A1 | 12/2009 | Wormington et al. |
| 2010/0037170 A1 | 2/2010 | Poole |
| 2010/0122174 A1 | 5/2010 | Snibbe et al. |
| 2011/0039602 A1 | 2/2011 | McNamara et al. |
| 2011/0061108 A1 | 3/2011 | Arrasvuori et al. |
| 2014/0181211 A1 | 6/2014 | Narayanan et al. |

FOREIGN PATENT DOCUMENTS

| | | |
|---|---|---|
| CN | 101536466 A | 9/2009 |
| JP | 2004-062814 A | 2/2004 |
| JP | 2004-326459 A | 11/2004 |
| JP | 2008-123233 A | 5/2008 |
| KR | 10-2008-0080961 | 9/2008 |
| KR | 10-0885733 | 2/2009 |
| WO | WO 2009-145902 | 12/2009 |

OTHER PUBLICATIONS

International Search Report dated Sep. 27, 2011 in International Application No. PCT/US2011/024095.
Anonymous, "EnjoyMyMedia Introduces First Personal Broadcasting Service for Family," Jun. 26, 2007, Business Wire, 3 pp.
European Office Action dated Dec. 3, 2013 in European Application No. 11742701.3.
U.S. Official Action dated Mar. 28, 2012 in U.S. Appl. No. 12/704,533.
U.S. Official Action dated Nov. 7, 2012 in U.S. Appl. No. 12/704,533.
U.S. Official Action dated Jun. 13, 2013 in U.S. Appl. No. 12/704,533.
U.S. Notice of Allowance dated Oct. 22, 2013 in U.S. Appl. No. 12/704,533.
U.S. Official Action dated Apr. 24, 2014 in U.S. Appl. No. 14/195,426.
U.S. Official Action dated Aug. 20, 2014 in U.S. Appl. No. 14/195,426.
Japanese Official Action dated Oct. 20, 2014 in Japanese Application No. 2012-552930.
Chinese Official Action dated Dec. 2, 2014 in Chinese Application No. 201180009136.3.
Office Action for U.S. Appl. No. 14/195,426, mailed on Mar. 19, 2015.
Translated Japanese Office Action mailed Mar. 26, 2015 for Japanese patent application No. 2012-552930, a counterpart foreign application of U.S. Appl. No. 12/704,533, 6 pages.
Office Action for U.S. Appl. No. 14/195,405, dated Apr. 18, 2014.
"Final Office Action Issued in U.S. Appl. No. 14/195,426", Mailed Date: Mar. 19, 2015, 12 Pages.
The Chinese Office Action mailed Aug. 6, 2015 for Chinese patent application No. 201180009136.3, a counterpart foreign application of U.S. Pat. No. 8,666,826, 14 pages.
Office action U.S. Appl. No. 14/195,426, mailed on Jul. 16, 2015, Narayanan et al., "Social Network Media Sharing with Client Library", 16 pages.

SOCIAL NETWORK MEDIA SHARING WITH CLIENT LIBRARY

CROSS REFERENCE TO RELATED APPLICATIONS

This application is a continuation of U.S. application Ser. No. 12/704,533 filed Feb. 12, 2010 entitled "Social Network Media Sharing with Client Library," now U.S. Pat. No. 8,666,826, which is expressly incorporated herein by reference.

BACKGROUND

Social networking sites have become popular with Internet users. Users of social networking sites often have the ability to update a status associated with a user account to inform members of their social network of a current thought, activity, event, or the like. In general, status updates can be directed to user-generated content, links to other content, and/or commercial content. For example, a user may update a status to reflect a thought, a mood, an event, or to share information such as a link, document, or other resource with members of the user's social network. Members of the user's social network are typically able to access the user-generated content, however, and the links to the other content. In the case of commercial content, a subscription or purchase may be required for a member of a user's social network to view or access the content posted by the user. For example, if a user posts a link to an article or other content for which a subscription is required, the link to the content may be of little or no interest to a member of the social network without such a subscription.

One common mechanism for circumventing subscription requirements includes copying and pasting article contents into a status update. Another common mechanism includes a user sharing his or her account login information associated with a subscription required to view the shared content with members of his or her social network to allow the members of the social network to access the commercial content. These and other approaches may violate not only user agreements associated with the shared commercial content, but also may violate copyright laws.

Similarly, a social networking site user may wish to share content controlled by various access control mechanisms, e.g., digital rights management (DRM) technologies. For example, a user may wish to share multimedia content such as music files, videos, and electronic books ("multimedia content") in addition to articles, web pages, and the like. Multimedia content, as well as other content, may be digitally tracked, managed, and/or controlled to reduce the incidence of unlawful and/or unauthorized use of the content. As users become more aware of copyright laws and DRM control mechanisms, their ability and/or willingness to share multimedia content may be limited.

It is with respect to these and other considerations that the disclosure made herein is presented.

SUMMARY

Concepts and technologies are described herein for providing media content information sharing. The concepts and technologies disclosed herein can be employed to share media content metadata with members of a social network. Through an implementation of the concepts and technologies presented herein, metadata or other information associated with media content (hereinafter collectively referred to as "metadata") can be shared with a user's social network, for example via a social networking site, a Web log ("blog"), or the like. An application running at or in conjunction with the user's computer can obtain metadata associated with the media content being played at the user's computer. The metadata can be transmitted to a social networking site and posted in a format appropriate for the site.

A member of the user's social network can view the shared metadata, and may be presented with a control to play the media content corresponding to the shared metadata. Upon selecting the option to display or access the media content corresponding to the shared metadata, the member's computer can be prompted to search a data storage device associated with the member's computer and/or the member, to determine if the member has access to a copy of the media content corresponding to the shared metadata. If the member has access to a copy of the media content corresponding to the shared metadata, the member's computer can present the content to the member. If the member does not have access to a copy of the media content corresponding to the shared metadata, the member's computer can use the metadata to generate and present options for the user to preview and/or purchase the media content corresponding to the shared metadata, to browse another data storage location for a copy of the media content corresponding to the shared metadata, and/or other options.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
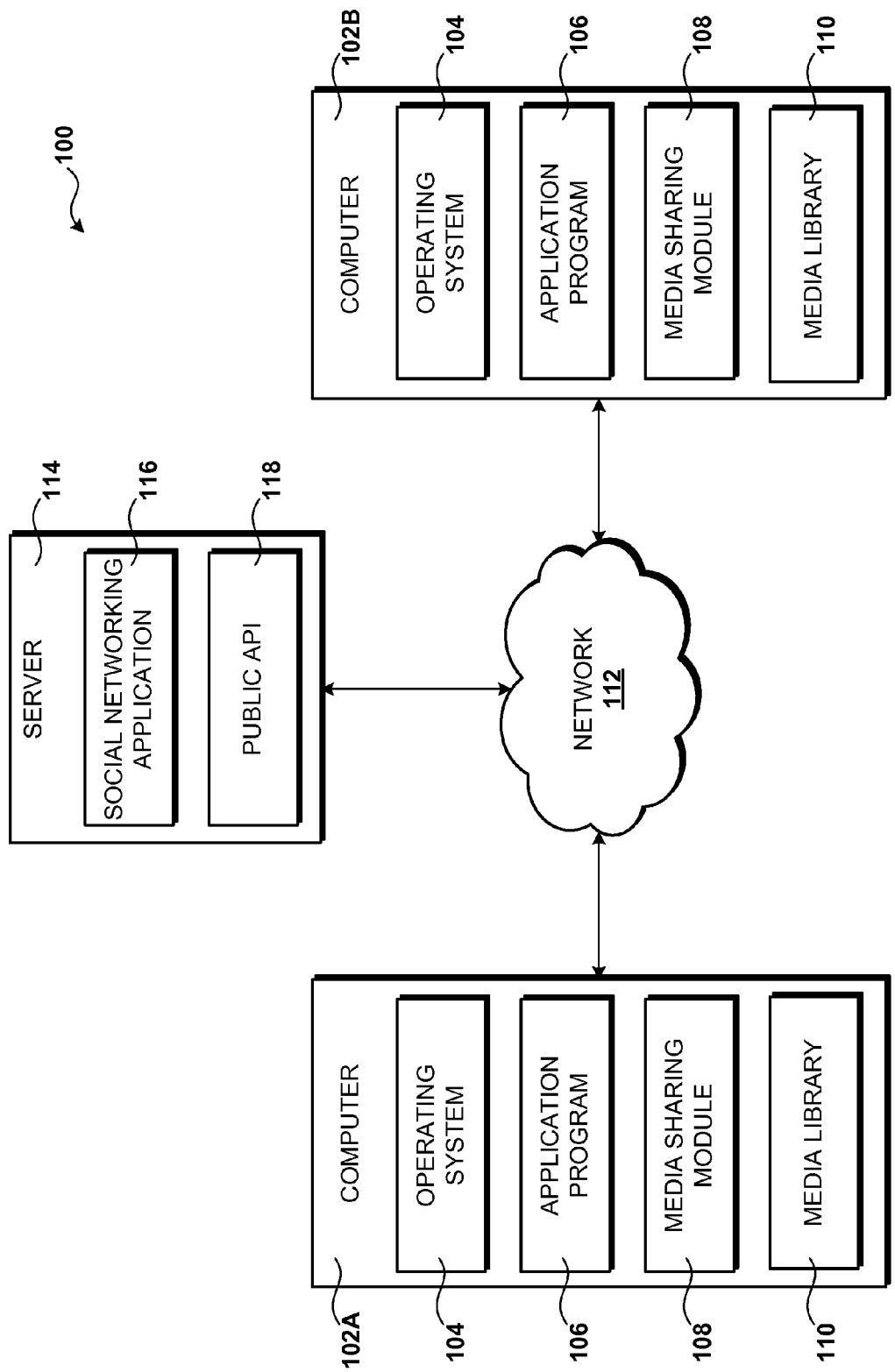
FIG. 1 is a system diagram illustrating an exemplary operating environment for the various embodiments disclosed herein.

The following detailed description is directed to technologies for sharing media. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements throughout the several figures, aspects of a computing system, computer-readable storage medium, and computer-implemented methodology for providing media sharing will be presented.

Referring now to FIG. 1, aspects of one operating environment 100 for the various embodiments presented herein will be described. The operating environment 100 shown in FIG. 1 includes a computer 102A configured to execute an operating system 104, an application program 106, and a media sharing module 108. The computer 102A also is configured to store media content, for example, in a media library 110, for use by one or more hardware and/or software components of the computer 102A. According to various embodiments, the computer 102A includes a standard desktop or laptop personal computer system. It should be appreciated, however, that the computer 102A may include other types of computing systems, including a server computer, a handheld computer, an embedded computer system, a personal digital assistant, a mobile telephone, or another type of computing device known to those skilled in the art.

As known to those skilled in the art, the operating system 104 is a computer program for controlling the operation of the computer 102A. The application program 106 is an executable program configured to execute on top of the operating system 104. The application program 106 may include any type of application program including, but not limited to, a word processing program, a spreadsheet program, an electronic mail program, a database program, a media playback program, a web browser, a social networking program, or another type of program. As will be discussed in greater detail below, the various technologies presented herein for media sharing may be utilized with virtually any type of application program 106 that receives and performs commands based upon input provided by a user.

The computer 102A may be connected to one or more networks 112, and may operate in conjunction with other computing systems on or in communication with the network 112 to provide the functionality described herein. In some embodiments, the computer 102A communicates with a server 114 that operates on, or in communication with, the network 112. In the illustrated example, the server 114 is a web server accessible via the Internet, and provides a social networking service to users who connect to the server 114. The server 114 includes a social networking application 116 and a public API 118. Users can connect to the server 114 to control and/or access features of a social networking service in several ways. For example, users can access the features via a social networking site generated by the social networking application 116, via the public API 118, via a back end interface with the server 114 (not illustrated), or via other connections and/or interfaces.

As illustrated in FIG. 1, one or more additional computers 102B can access the server 114 via the network 112. The computer 102B can operate in a manner substantially similar to the computer 102A. As such, the illustrated components 104, 106, 108 of the computer 102B will not be described in additional detail herein. It should be understood, however, that the media content stored in the media library 110 of the computer 102B may differ from the media content stored in the media library 110 of the computer 102A. In other words, while the function of the media libraries 110 of respective computers 102A, 102B may be similar, the actual data content of the respective media libraries 110 may differ.

As will be described in greater detail below, a media sharing module 108 executes in conjunction with the application program 106 to provide the computers 102A, 102B with the functionality disclosed herein for providing media content metadata sharing. While the media sharing modules 108 are illustrated in FIG. 1 as distinct entities, it should be appreciated that the functionality disclosed herein as being performed by the media sharing module 108 may be provided by the application program 106 or another component of the computers 102A, 102B. According to other implementations, the media sharing module 108 may operate in conjunction with the operating system 104 and/or the application program 106 to provide sharing of media content metadata with a social network. In this regard, it also should be appreciated that the functionality disclosed herein as being performed by the media sharing module 108 also may be incorporated directly within the operating system 104 and/or the application program 106.

As will be explained in more detail below, concepts and technologies of the present disclosure allow a user of a social networking service to share media content metadata with members of the user's social network. With reference to FIG. 1, the user can access the social networking site with the computer 102A. Media content being utilized by the computer 102A can be identified, for example using the application program 106 and/or the media sharing module 108, and metadata associated with the media content can be formatted and shared with the server 114 via the social networking application 116 and/or the public API 118. The social networking application 116 publishes the shared metadata to an account associated with the user of the computer 102B.

A member of the user's social network accesses the user's social networking information by accessing the server 114 with the computer 102B. The social networking application 116 configures the shared metadata such that the shared metadata is visible to the member of the user's social network. The member of the user's social network enters a command to utilize media content corresponding to the shared metadata. Upon receiving the command to utilize the media content, the application program 106 and/or the media sharing module 108 of the computer 102B searches the media library 110 of the computer 102B to determine if a copy of the media content corresponding to the shared metadata exists at the computer 102B.

If a copy of the media content corresponding to the shared metadata exists at the computer 102B, the computer 102B plays, displays, accesses, or otherwise utilizes, the media content corresponding to the shared metadata. If a copy of the media content corresponding to the shared metadata is not found at the computer 102B, the application program 106 and/or the media sharing module 108 at the computer 102B are configured to generate options for purchasing or otherwise accessing a copy of the media content corresponding to the shared metadata. The options are presented to the member of the user's social network.

It should be appreciated that the operating environment 100 illustrated in FIG. 1, and described briefly above, is merely illustrative, and that other operating environments for providing the functionality disclosed herein may be utilized. Similarly, it should be understood that metadata may be shared by a user of the computer 102B, and that shared metadata can be used by the computer 102A. Because the functionality of the computers 102A, 102B can be similar or even identical, this description will refer to the computers collectively with the reference numeral 102. Additional details regarding the operation of the application program 106, the media sharing module 108, and the use of the shared metadata by another user, computer, and/or other device, will be provided below with respect to FIGS. 2A-5.

Figure 2A:
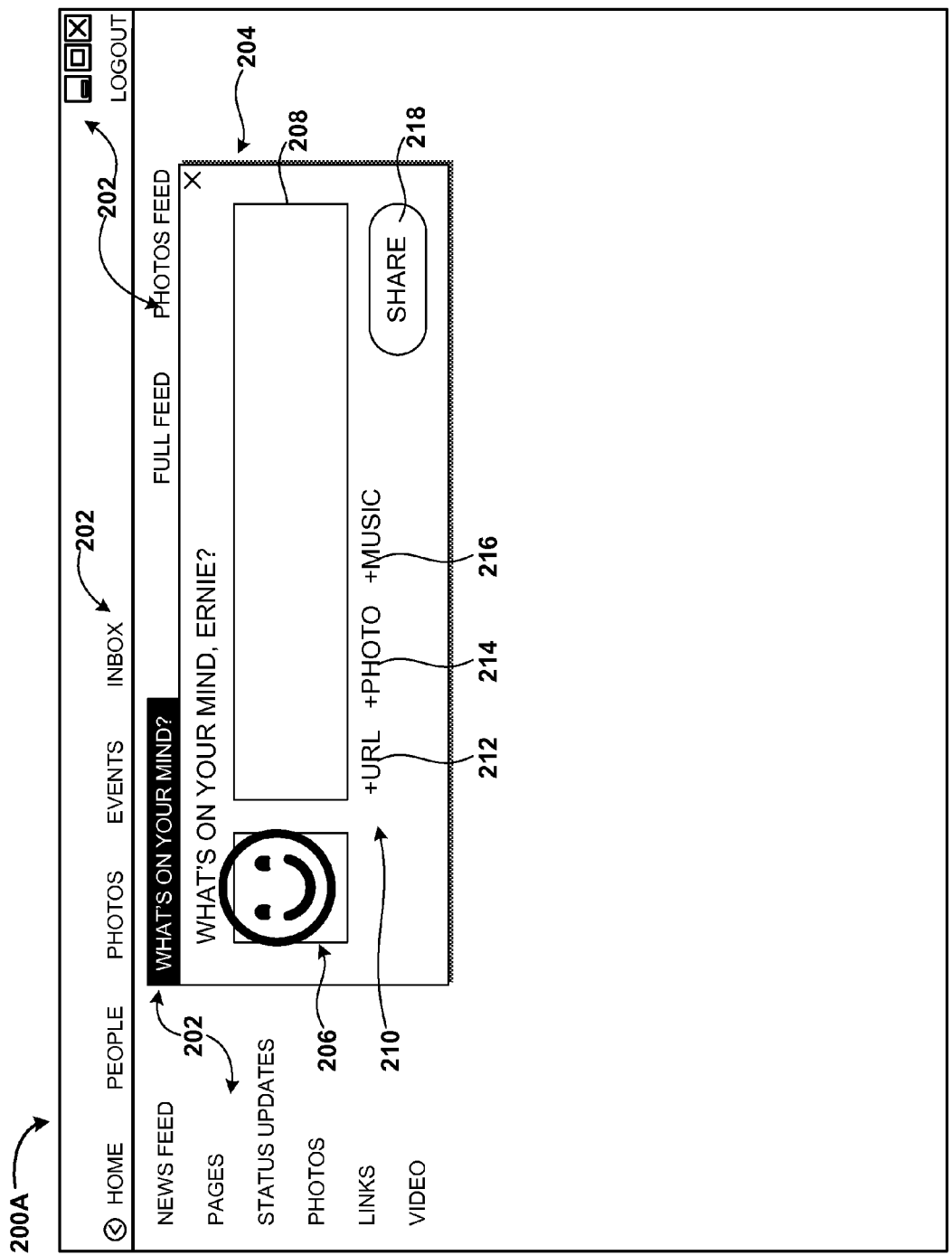
FIGS. 2A-2E are user interface diagrams showing aspects of various exemplary user interfaces provided by a media sharing module disclosed herein in various embodiments.

Turning now to FIG. 2A, a user interface diagram showing aspects of a user interface provided by the application program 106 in one embodiment will be described. In particular, FIG. 2A shows a screen display 200A generated by the application program 106 according to one particular implementation presented herein. In this implementation, the application program 106 includes an application program for interacting with a social networking website. In some embodiments, the application program 106 is a web browser accessing a social networking site.

In some embodiments, the application program 106 includes a stand-alone out-of-browser application that is configured to interface with the an API exposed by a social networking site, for example, the public API 118 exposed by the server 114. As is generally known, stand alone applications can be generated using various developer tools and/or software packages including, but not limited to, MICROSOFT SILVERLIGHT, ADOBE FLASH, ADOBE AIR, and/or other platforms and/or tools. Thus, it should be appreciated that the user interface diagrams illustrated in FIGS. 2A-2E are merely illustrative, and that the embodiments presented herein may be utilized with many different types of user interfaces provided by many different types of application programs 106.

The screen display 200A shown in FIG. 2A includes various menu items 202 for navigating and/or modifying an account associated with the social networking service or site. The illustrated menu items 202 include, but are not limited to, UI controls to update a user's status, change a view, navigate to various pages, logout of a user account, view events, view a messaging service provided by the social networking service, view links, view photos, view videos, access chatting services, other controls, and the like. It should be understood that the illustrated menu items 202 are merely illustrative, and that additional and/or alternative menu items are both possible and contemplated.

In the illustrated embodiment, the user has selected a UI control to update a status. Thus, the UI control corresponding to this option is illustrated as highlighted, and an input UI 204 is being displayed. The input UI 204, which may be displayed when the application is initialized, when a social networking site is loaded, and/or when triggered or accessed by selecting one or more of the menu items 202, is merely illustrative of a contemplated embodiment of the present disclosure. As such, the format and controls illustrated and described herein should not be construed as being limiting in any way. The illustrated input UI 204 includes a graphic 206, which may include a photo or graphic designated by a user associated with a social networking account to identify the user. In the illustrated embodiment, the input UI 204 includes an input field 208 and an input option menu 210. The input field 208 includes a text box for inputting alphanumeric characters to display a message.

The input option menu 210 includes a UI control 212 that, when selected, causes the computer to post a link, for example, a uniform resource locator ("URL"). It should be understood that the functions provided by the UI control 212 also may be used to associate a URL with a message input at the input field 208. The input option menu 210 further includes a UI control 214 that, when selected, causes the computer to post a photo, or to associate a photo with a message input at the input field 208. Additionally, the input option menu 210 includes a UI control 216 that, when selected, causes the computer to share metadata associated with media content, for example a music file. It should be understood that the illustrated input option menu 210, and the UI controls 212, 214, 216 illustrated and described in relation thereto, are merely exemplary and should not be construed as being limiting in any way. Additionally, it should be understood that the functions provided by the UI control 216 may be used to post metadata for a variety of media content, and are not limited to music or other audio content. The input UI 204 also includes a UI control 218 that, when selected, causes the computer to share information entered into the input UI 204. Additional and/or alternative fields, UI controls, and menu items are possible and are contemplated.

The application program 106 may receive many different types of commands. For example, the application program 106 may receive commands as mouse clicks and/or key entries on or at the menu items 202, mouse clicks or key entries on or at the UI controls 212, 214, 216, 218, text entry in the input field 208, and/or through other mechanisms, such as voice commands and/or dedicated keyboard commands. Therefore, as utilized herein, the term "command" encompasses any request to perform functionality that is received from a user.

As will be discussed in greater detail below, the media sharing module 108 operates in conjunction with the application program 106 to perform various functionality to share media content metadata. For example, the application program 106 and/or the media sharing module 108 can collectively or individually obtain metadata and/or other information associated with media content and share the metadata with a social networking site. Additionally, the application program 106 and/or the media sharing module 108 can collectively or individually access the shared metadata to identify media content corresponding to the shared metadata, to query or interrogate a data storage device of a computer 102 at which the application program 106 and/or the media sharing module 108 are executed to determine if the computer 102 has authorization to view, display, playback, perform, or otherwise access (hereinafter collectively referred to as "utilize") a copy of the media content corresponding to the shared metadata, to provide playback of the media content corresponding to the shared metadata for authorized users, and/or to provide users with options for obtaining a copy of or access to the media content corresponding to the shared metadata. Additional details regarding the operation of the application program 106 and the media sharing module 108, as well as illustrative user interfaces provided thereby, are illustrated and described below with additional reference to FIGS. 2B-5.

Figure 2B:
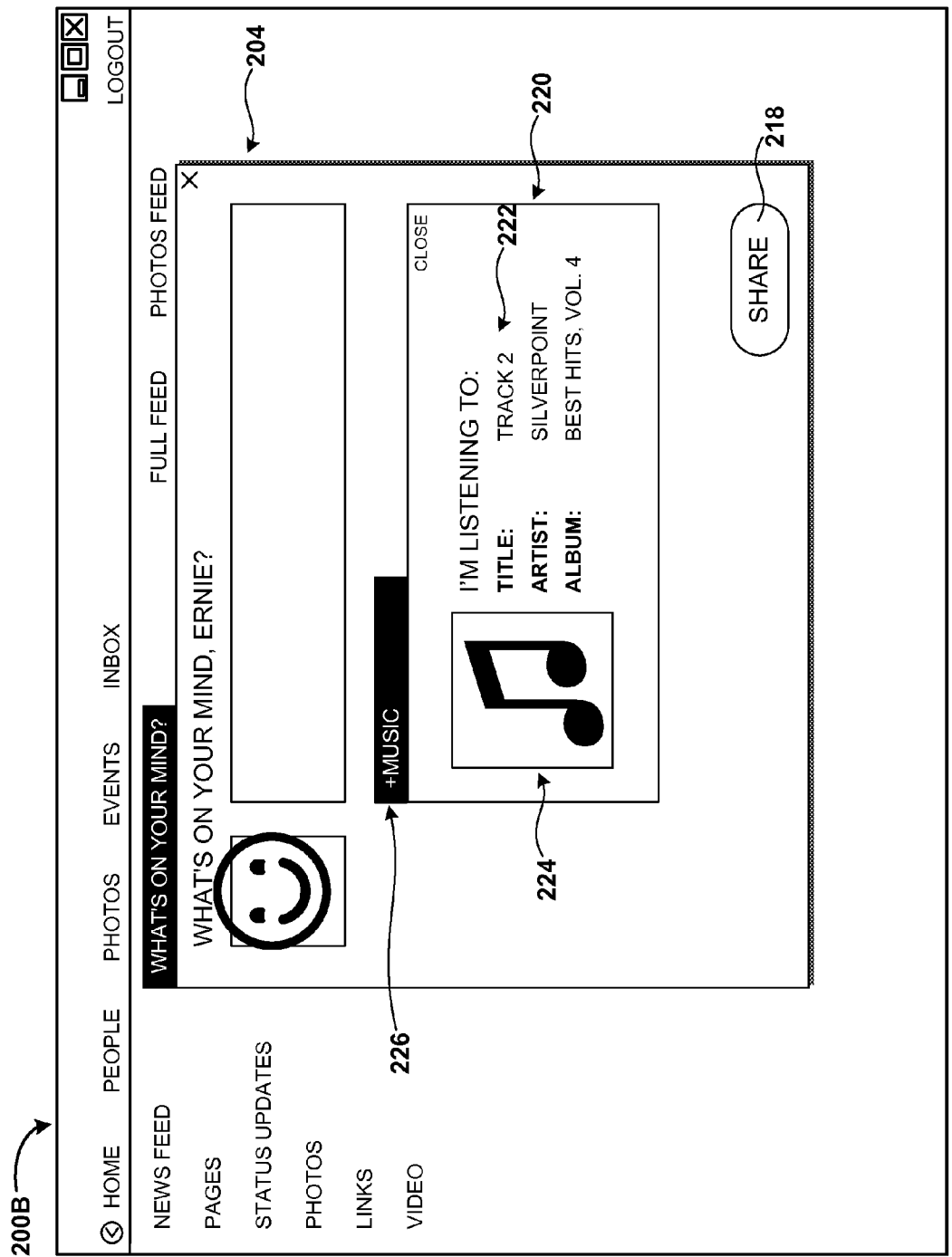

Referring now to FIG. 2B, a user interface diagram showing aspects of a user interface provided by the application program 106 and the media sharing module 108 in one embodiment will be described. In particular, FIG. 2B shows another screen display 200B generated by the application program 106. The screen display 200B illustrated in FIG. 2B may include a modification of the input UI 204 of FIG. 2A, as modified in response to a user selecting the UI control 216 to share media content metadata. As illustrated in FIG. 2B, the input UI 204 window illustrated in FIG. 2A has been expanded and now includes a media content sharing UI 220. The media content sharing UI 220 further includes media information 222.

The media information 222 can be reviewed by the user prior to sharing the media information 222 with the networking site. As is explained herein, the media information 222 can include and/or can be based upon metadata associated with media content being utilized at the computer 102. For example, the media information 222 can be generated by the application program 106 and/or the media sharing module 108 in response to a user entering a command to share media content metadata with a social networking site. In response to the command, the application program 106 and/or the media sharing module 108 obtains metadata associated with media content being utilized at the computer 102, determines which metadata to present to the social networking site, and formats the metadata in the proper format. For example, the metadata can be formatted as illustrated by the media information 222.

In some embodiments, the functionality of the application program 106 is provided by a web browser, and that the functionality of the media sharing module 108 is provided by a media player that is accessible by a web application that generates a "call" to a local resource such as, for example, a media player in use at a computer 102 or another device. In some embodiments, social networking site interaction is provided by a stand-alone out-of-browser application ("client") that interfaces with a media player running at a computer 102 or another device. As such, the functionality of the application program 106 and the media sharing module 108 can be provided by the stand-alone application, by a media player and the stand alone application, respectively, and/or by the stand alone application and the media player, respectively. In yet other embodiments, a media player application performs the functionality of both the application program 106 and the media sharing module 108. In such embodiments, the media player is configured to obtain media content metadata and to upload the metadata to a social networking site via a public API exposed by a website associated with the social networking service. Thus, the functionality described herein can be applied to various combinations of applications and services, without departing from the scope of the present disclosure.

Regardless of the configuration used to provide the functionality of the application program 106 and/or the media sharing module 108, it should be understood that an application playing or otherwise providing access to the media content may be queried for media information by the application program 106 and/or the media sharing module 108. In response to such a query, the application playing or otherwise providing access to media content can identify the media content being utilized and can format metadata identifying the media content. The metadata can be formatted such that the media content can be accurately determined by an application accessing the metadata, as will be explained below.

Returning to the exemplary screen display 200B, a user has selected a control to share media content metadata with a social network, for example, by selecting the UI control 216 described with reference to FIG. 2A. As such, in the illustrated example, the media information 222 includes data relating to a song title such as, for example, an artist who performs the shared music file, an album that includes the shared music file, graphics and/or other art 224 ("album art") associated with the shared music file, time duration data associated with the shared music file, and/or any other information.

As mentioned above, the media content for which metadata is obtained and shared can include music files, video files, electronic books, articles, web pages, and the like, and other content. Thus, it should be understood that if the media content includes a video, the media information 222 can include, for example, metadata indicating actors appearing in the video, if any, a location associated with the video, time duration data associated with the video, a codec used to encode or decode the video, a rating associated with the video, copyright information associated with the video, combinations thereof, and the like. Similarly, if the shared content includes a document and/or other publication, the media information 222 can include a number of pages, an author, a subject, other categorization information, copyright information, source information, combinations thereof, and the like. It should be understood that these examples are merely illustrative of various media that can be shared and should not be construed as being limiting in any way.

As illustrated in FIG. 2B, the input UI 204 includes a heading 226. It should be appreciated that the heading 226 can indicate a function selected by a user, for example, from the input UI 204 as described above with reference to FIG. 2A. The heading 226 can be a simple heading identifying a function provided by the input UI 204, and/or can have additional or alternative functionality associated therewith. In one contemplated embodiment, the heading 226 can be selected by a user to provide functionality similar to that provided by the UI control 216 described above. Thus, a user updating his or her status via the input UI 204 can select the heading 226 to refresh and/or update the media content metadata.

It will be appreciated that including the ability to refresh the media content metadata may be used by a user, for example, in a situation in which a user decides to share media content metadata corresponding to first media content, selects a control to share the metadata, but begins playing or utilizing different media content before completing an action to share the metadata corresponding to the first media content. For example, a user may be listening to an album and decide to share metadata corresponding to the song with his or her social network. Prior to completing the sharing process, however, a song playing when the media information 222 was retrieved ends. Thus, the media information 222 may now be outdated and would not be accurate if posted to a social networking site. Similarly, if the user began playback of different media after the media information 222 was retrieved, as well as in other situations, the user can click on the heading 226 to refresh the media information 222 prior to updating his or her status.

Although not illustrated in FIG. 2B, it should be understood that a user can be given a control to select or de-select the sharing of one or more metadata identifying the media content. As such, a check box or other UI control can be provided adjacent some or all identifying data to allow a user to select whether to share that particular data. In the illustrated example, check boxes or other UI controls can be provided adjacent the "title," the "artist," the "album," and/or the album art 224, thereby allowing a user to share some or all of the media information 222. Thus, a user may share the specific track of the album, the album, the artist, other information, and/or a combination thereof, without sharing all of the media information 222. It will be appreciated that a user may decide to share only an album name so that the status will be valid for a longer period of time than would be the case if a particular track is shared. These examples are merely illustrative, as mentioned above.

Figure 2C:
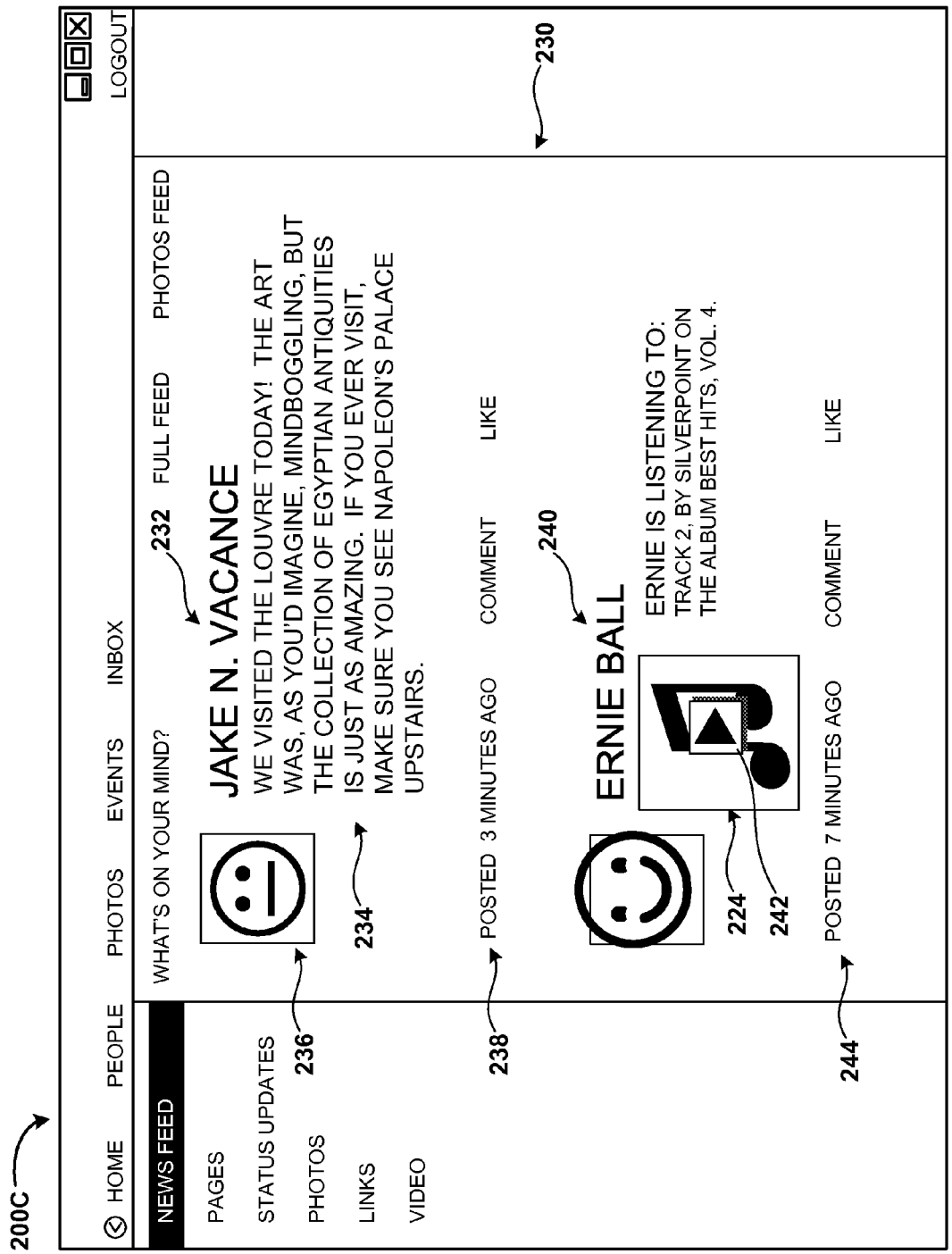

Turning now to FIG. 2C, a user interface diagram showing aspects of a user interface provided by the application program 106 in one embodiment will be described. In particular, FIG. 2C shows another screen display 200C generated by the application program 106 according to one particular implementation presented herein. The illustrated screen display 200C includes a news feed UI 230 that is populated with information posted by members of a user's social network. The news feed UI 230 includes a first news item 232 posted by a first member of the user's social network. The first news item 232 can include, for example, a status update 234 submitted by a first user, a graphic 236 associated with the first user, information relating to the status update 238, for example, a time in which the status was updated, a control to comment or vote on the status update, and/or other controls. It should be understood that the illustrated news item 232 is exemplary only and is provided solely to clarify concepts of the present disclosure. The news feed UI 230 further includes a second news item 240 posted by a second member of the user's social network. It should be understood that the second news item 240, can be generated via the user interface illustrated in FIGS. 2A-2B.

As illustrated in FIG. 2C, the second news item 240 includes a status update relating to a second user. In the illustrated example, the status update includes the media information 222 described above, and relates to media content information shared by the user associated with the second news item 240. Thus, the media information 222 can include, for example, time duration information, media title information, album information, sample rate information, file format information, other information relating to the media, combinations thereof, and the like. The second news item 240 further includes the album art 224 or other media art associated with the shared media. Additionally, as illustrated in FIG. 2C, the second news item 240 further can include a UI control 244 that, when selected, causes a computer to play media content corresponding to the shared metadata. As described with respect to the first news item 232, the second news item 240 can include information relating to the status update 246, which can include a time at which the status update was submitted, controls to comment or vote on the status update, and/or other controls.

It will thus be appreciated that the media content metadata shared via the application program 106 and/or the media sharing module 108 can be viewed by members of a user's social network. Additionally, a member of a user's social network can have the ability to playback or otherwise access the media content corresponding to the shared metadata.

As will be explained in more detail below, a member of a user's social network can enter a command to playback or otherwise access the media content corresponding to the metadata shared by the user. In response to receiving the command to playback or access the media content corresponding to the shared metadata, the application program 106 and/or the media sharing module 108 are configured to determine if the member of the user's social network has access to a copy of the media content corresponding to the shared metadata.

As explained above, the media information 222 can be generated by querying a media playback application to obtain metadata describing media content being utilized at or in proximity to the computer 102. This metadata can be shared with and/or submitted to a social networking site or service, for example, as or in conjunction with a status update as described above with reference to FIG. 2B. The shared metadata can be stored in a manner that makes the shared metadata accessible to the application program 106 and/or the media sharing module 108 associated with a member of the user's operating at a computer of a party attempting to playback or otherwise utilize the media content corresponding to the shared metadata.

The application program 106 and/or the media sharing module 108 is configured to use the metadata to identify the media content, and to query a data storage device associated with the device attempting to playback or otherwise access the media content corresponding to the metadata to determine if a copy of the media content is accessible. Thus, the application program 106 and/or the media sharing module 108 query and/or interrogate a media library or a media playback device to determine if a copy exists. If a copy of the media content corresponding to the metadata is accessible by the device, the application program 106 and/or the media sharing module 108 can generate a user interface for utilizing the media content corresponding to the shared metadata. An exemplary user interface for utilizing media content is illustrated in FIG. 2D.

Figure 2D:
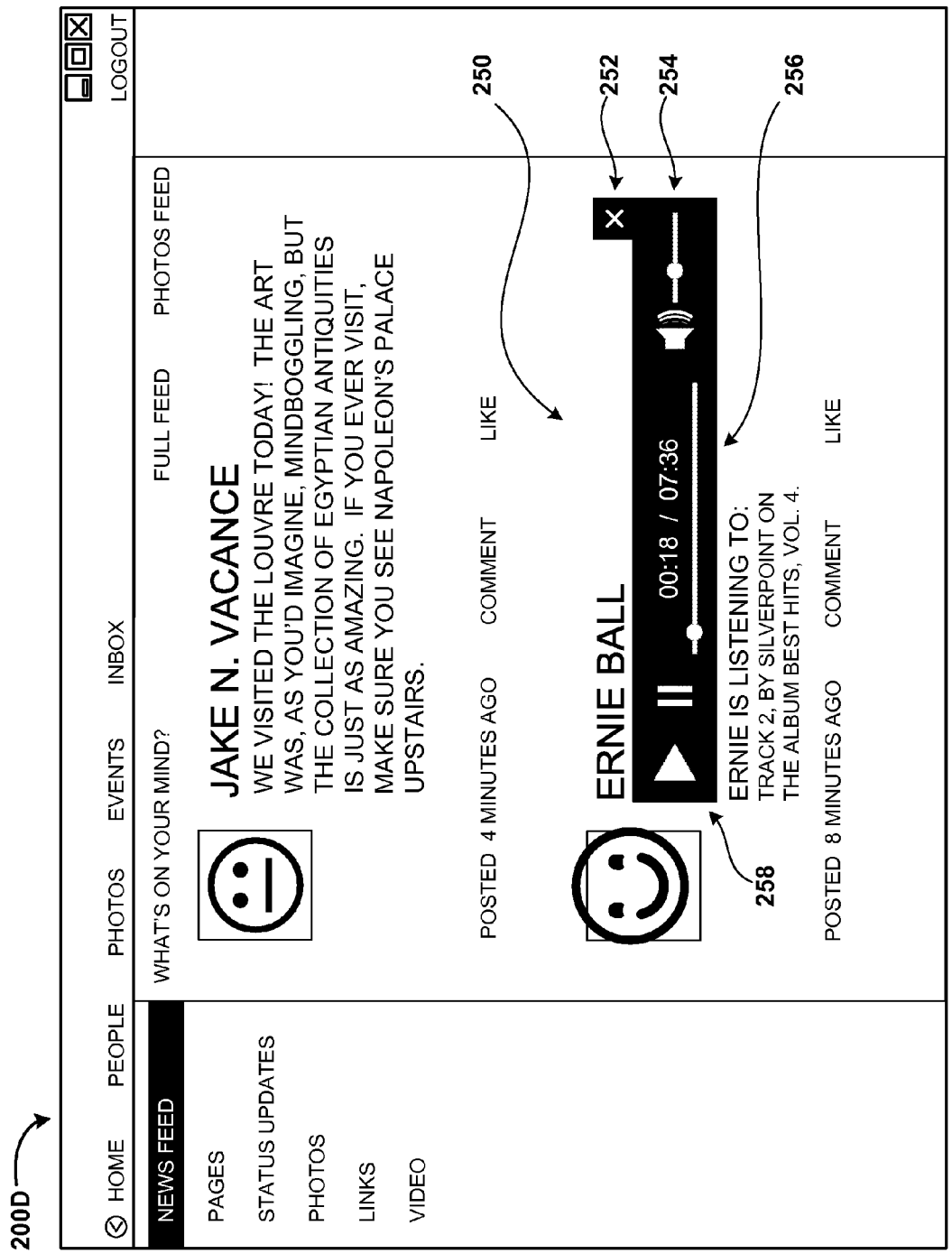

Turning now to FIG. 2D, a user interface diagram showing aspects of the user interface provided by the application program 106 and the media sharing module 108 in another embodiment will be described. In particular, FIG. 2D shows another screen display 200D generated by the application program 106. As illustrated in FIG. 2D, a media content UI 250 is illustrated, according to an exemplary embodiment of the present disclosure. The media content UI 250 includes a UI control 252 that, when selected, causes a computer to close the media content UI 250, a volume slider UI control 254 that, when manipulated, causes a computer to adjust the playback volume of the media content, a time slider and/or display 256 to display time information associated with the media content and playback of the media content, and playback controls 258 that can be manipulated to control the playback or display of the media content. The functions of these controls are generally known and will not be described in detail herein. Furthermore, it should be understood that the illustrated controls are merely exemplary, and that the media content UI 250 can include fewer, additional, and/or alternative controls.

The screen display 200D illustrated in FIG. 2D can be generated in response to a user selecting the UI control 244 discussed above with respect to FIG. 2C. Prior to utilizing the media content corresponding to the shared metadata and/or generating the media content UI 250 illustrated in FIG. 2D, the computer 102, or more particularly the application program 106 and/or the media sharing module 108, can access a data storage device associated with the computer 102 to determine if the computer 102 has a copy of the media content corresponding to the shared metadata.

If the computer does not have access to a copy of the media content corresponding to the shared metadata, the application program 106 and/or the media sharing module 108 can be configured to generate one or more purchase or access options for presentation to a user via a user interface. In some embodiments, for example, the application program 106 and/or the media sharing module 108 can generate one or more links to download or stream a copy of the media content corresponding to the shared metadata. For example, the application program 106 and/or the media sharing module 108 can generate a link to purchase a copy of the media content corresponding to the shared metadata via MICROSOFT ZUNE, APPLE ITUNES, AMAZON MP3, and/or another media provider. Additionally, or alternatively, the application program 106 and/or the media sharing module 108 can generate a link to preview the media content corresponding to the shared metadata, to stream the media content corresponding to the shared metadata from a free location such as YOUTUBE, GOOGLE video, YAHOO! audio, or the like, and/or other locations. Additionally, or alternatively, the application program 106 and/or the media sharing module 108 can prompt a user to browse an additional and/or alternative data storage location to search for a copy of the media content corresponding to the shared metadata. Such controls can be formatted and presented to a user via a user interface such as that illustrated in FIG. 2E.

Figure 2E:
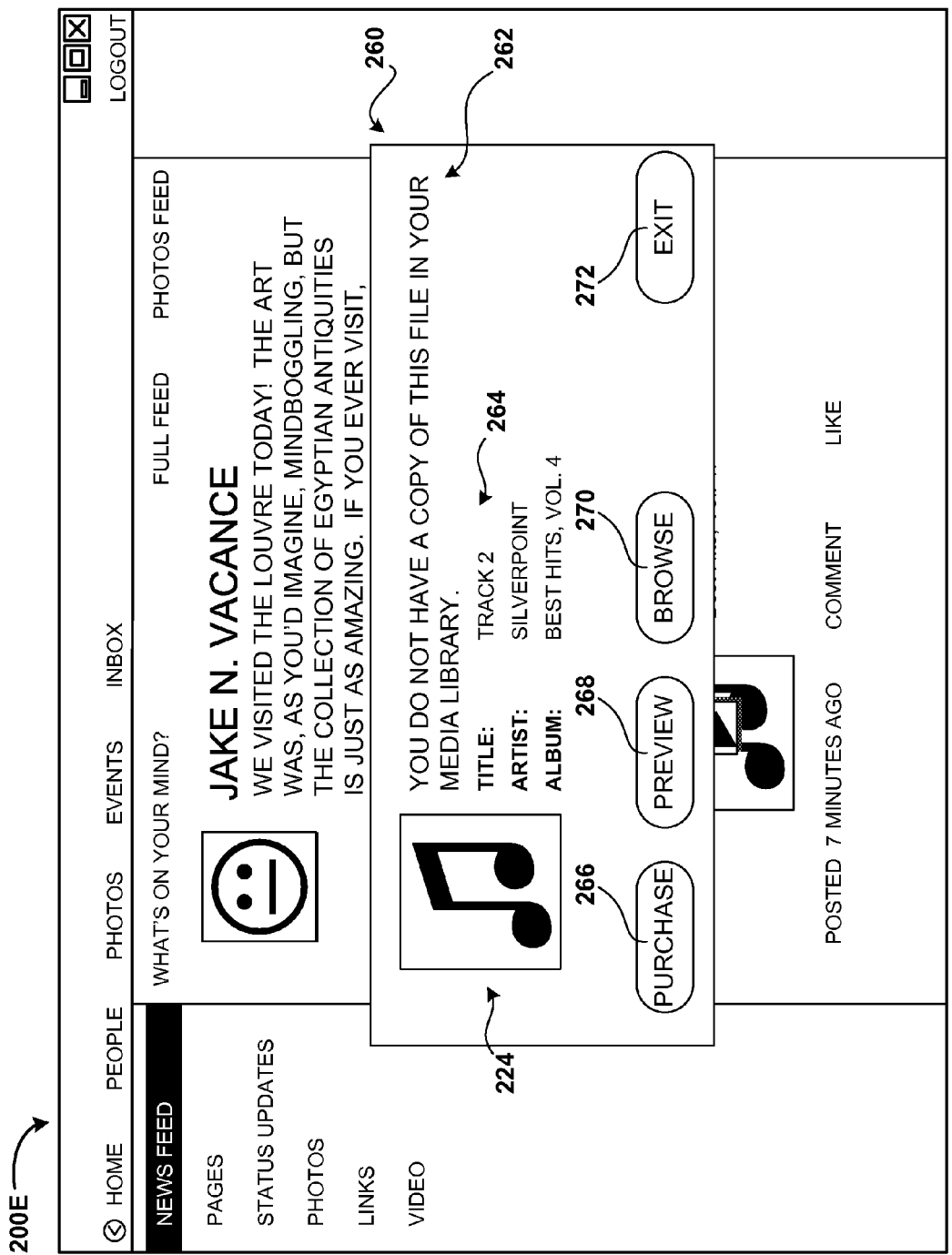

Referring now to FIG. 2E, a user interface diagram showing aspects of the user interface provided by the application program 106 and the media sharing module 108 in yet another embodiment is described. In particular, FIG. 2E shows yet another screen display 200E generated by the application program 106. The screen display 200E includes a media content indication window 260, which may be generated in response to a selection of a UI control such as the UI control 244 discussed above with reference to FIGS. 2C and 2D. The media content indication window 260 may be generated if a user does not have a copy of the media content corresponding to the shared metadata in a local library or library accessible to the computer 102, as explained above.

The illustrated media content indication window 260 includes a message 262 indicating that the queried or interrogated library does not include a copy of the media content corresponding to the shared metadata. The media content indication window 260 also includes media content information 264, which can be similar to the media information 222 illustrated in FIG. 2B, as well as album art 224 associated with the media content. The media content indication window 260 also can include options to obtain rights to view, play, display, stream, preview, and/or otherwise access or utilize the media content corresponding to the shared metadata. For example, the media content indication window 260 can include a UI control 266 that, when selected, causes a computer to purchase a copy of, or access to, media content corresponding to the shared metadata, a UI control 268 that, when selected, causes a computer to preview media content corresponding to the shared metadata, a UI control 270 that, when selected, causes a computer to browse a data storage device of, associated with, and/or accessible to, the computer 102 to locate a copy of the media content corresponding to the shared metadata, a UI control 272 that, when selected, causes a computer to exit the media content indication window 260, other UI controls (not illustrated), and the like.

Figure 3:
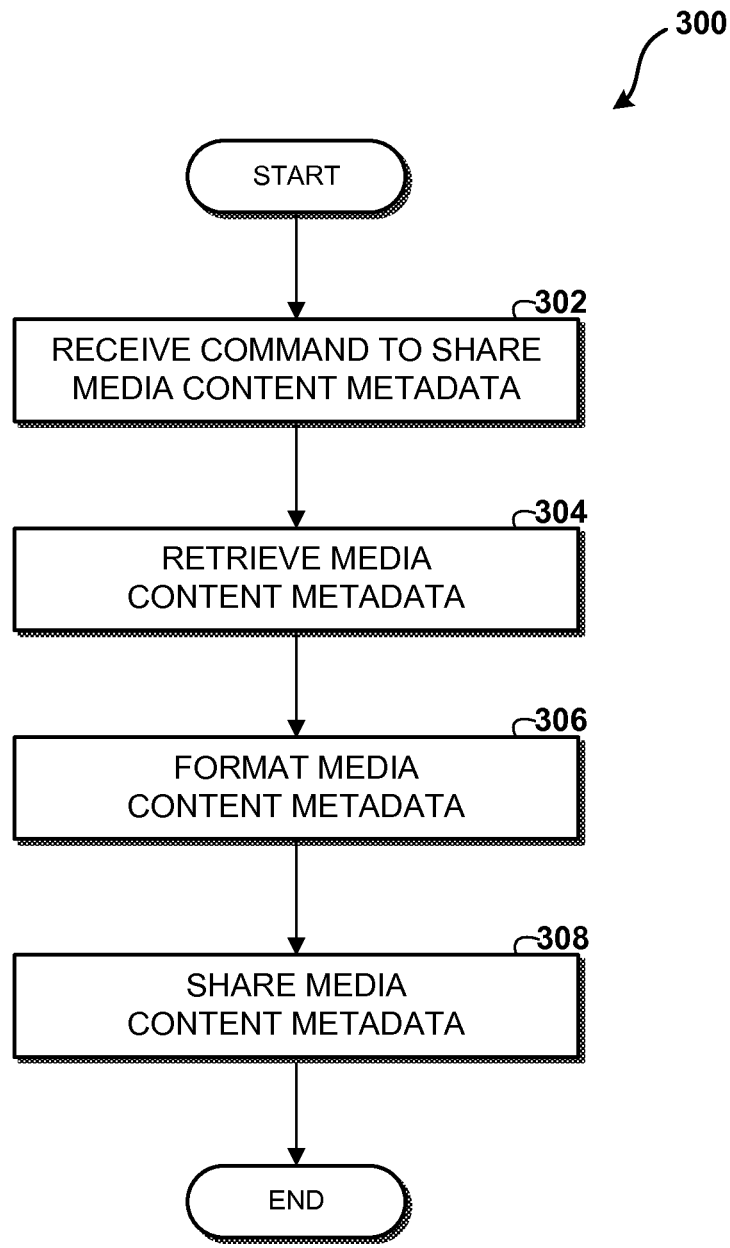
FIG. 3 is a flow diagram showing aspects of a method for sharing media, according to an exemplary embodiment of the present disclosure.

Turning now to FIG. 3, a method 300 for sharing media content metadata will be described in detail. It should be understood that the operations of the method 300 are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 300 can be ended at any time and need not be performed in its entirety. Some or all operations of the method 300, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. For purposes of illustrating and describing the concepts of the present disclosure, the method 300 is described as being performed by the computer 102, though it will be understood that the computer 102 can provide the functionality described herein by execution of the application program 106 and/or the media sharing module 108. Thus, the described embodiment is merely exemplary and should not be viewed as being limiting in any way.

The method 300 begins at operation 302, wherein a computer 102 receives a command to share media content metadata. As illustrated and described above, the command to share media content metadata can be received in several different ways. For example, a user can enter a command to share media content metadata by clicking with a mouse on a menu item such as the UI control 216 illustrated in FIG. 2A. Additionally, or alternatively, a user may click on a UI control of a social networking site as displayed by a web browser, click on a UI control provided by a media playback application, enter a key sequence entered into an input field or prompt, enter a hot key or keystroke sequence, navigate to or access an address such as a particular URL, combinations thereof, and the like.

The method 300 proceeds to operation 304, wherein the computer 102 retrieves media information associated with the media content. As explained above, the application program 106, the media sharing module 108, and/or a media playback application can access metadata and/or other information associated with media content being played or otherwise accessed at the computer 102. In some embodiments, the metadata is retrieved by the application program 106, the media sharing module 108, and/or a media playback application and is submitted to a web service to identify the media content. The web service can respond to the application program 106, the media sharing module 108, and/or a media playback application with identifying information that can be used by another device or application to accurately identify the media content corresponding to the shared metadata.

The method 300 proceeds to operation 306, wherein the metadata is formatted into a form for sharing with the social networking service. For example, the metadata may be modified to place the data in a specific order to standardize presentation to accessing devices. Additionally, or alternatively, the metadata can be formatted into a specific language. It should be understood that the language, order, and/or format of the metadata can be formatted in accordance with one or more specifications set forth by a particular social networking service and/or site, and can vary from time to time. Thus, operation 306 can include any steps necessary to verify a desired format, language, and/or order, and to alter the metadata in accordance with the format, language, and/or order desired by a particular social networking service.

The method 300 proceeds to operation 308, wherein the formatted media information is posted to a desired program or device. For example, the application program 106, the media sharing module 108, and/or a media playback application can pass the formatted metadata to a web browser for posting to a social networking site. More particularly, the application program 106, the media sharing module 108, and/or the media playback application can pass the formatted metadata to a server that hosts a social networking site associated with the user's social network. Alternatively, the application program 106, the media sharing module 108, and/or a media playback application can transmit the formatted information directly to a social network service or site via a public API exposed by the social networking service and/or social networking site, as explained above. The method 300 ends.

Figure 4:
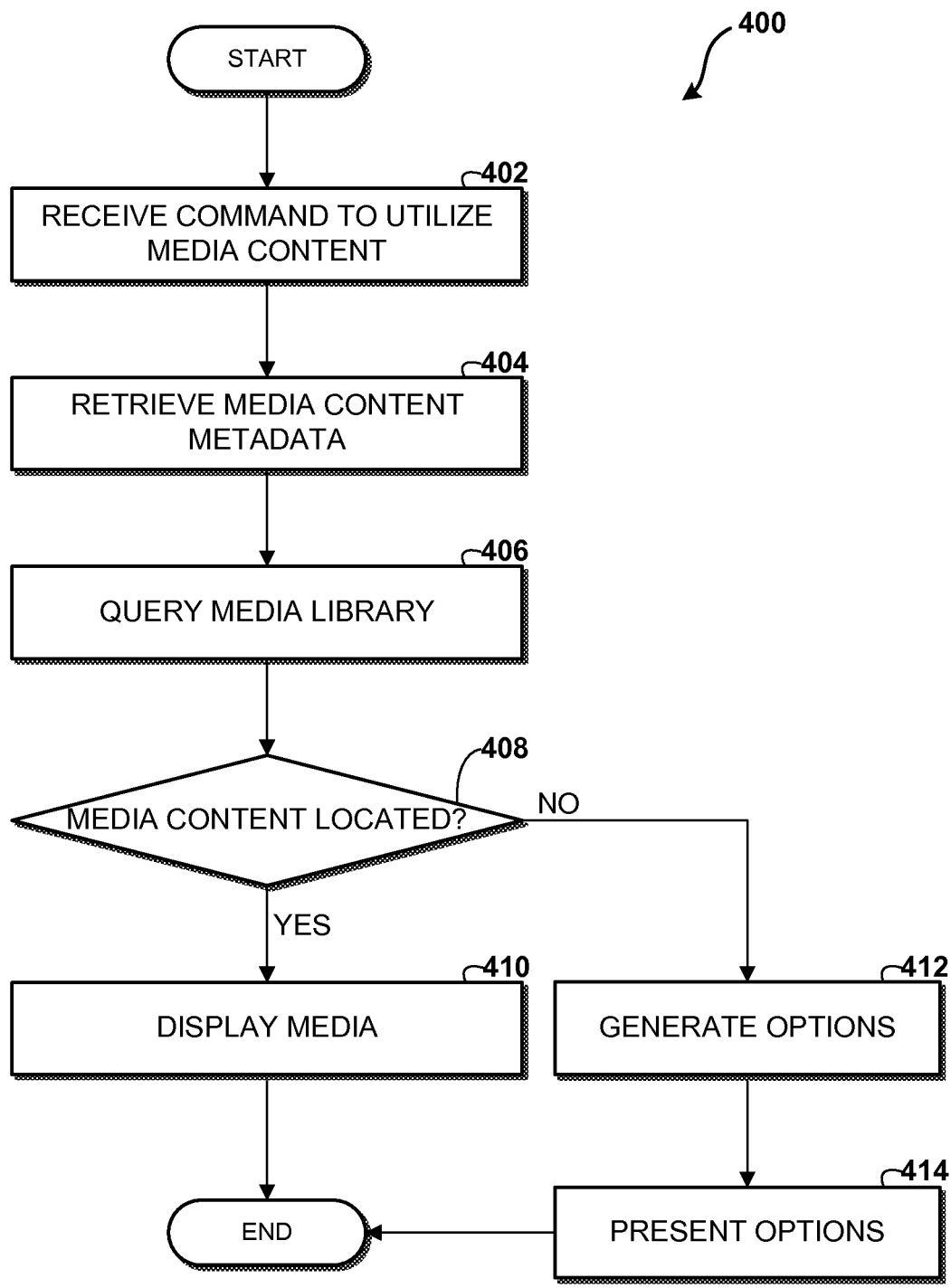
FIG. 4 is a flow diagram showing aspects of a method for playback of shared media, according to an exemplary embodiment of the present disclosure.

FIG. 4 schematically illustrates a method 400 for displaying shared media, according to an exemplary embodiment of the present disclosure. It should be understood that the operations of the method 400 are not necessarily presented in any particular order and that performance of some or all of the operations in an alternative order(s) is possible and is contemplated. The operations have been presented in the demonstrated order for ease of description and illustration. Operations can be added, omitted and/or performed simultaneously, without departing from the scope of the appended claims. It also should be understood that the illustrated method 400 can be ended at any time and need not be performed in its entirety. Some or all operations of the method 400, and/or substantially equivalent operations, can be performed by execution of computer-readable instructions included on a computer-storage media. As explained above with reference to the method 300 illustrated in FIG. 3, the method 400 illustrated in FIG. 4 is described as being performed by a computer 102, though it will be understood that the computer 102 can provide the functionality described herein by execution of the application program 106 and/or the media sharing module 108. Thus, the described embodiment is merely exemplary and should not be viewed as being limiting in any way.

The method 400 begins and proceeds to operation 402, wherein a command to utilize media content corresponding to shared metadata is received. As illustrated and described above, the command to utilize the media content corresponding to the shared metadata can be received in several ways. For example, a user can enter a command to utilize media content corresponding to the shared metadata by clicking with a mouse on a UI control such as the UI control 244 illustrated in FIG. 2C. Additionally, or alternatively, a user may enter a command to utilize the media content corresponding to the shared metadata by entering a hotkey or keystroke sequence, and the like.

Upon receiving a command to utilize the media content corresponding to the shared metadata, the method 400 proceeds to operation 404, wherein metadata associated with the media content is retrieved. As explained above, the metadata associated with the media content can be shared with a social networking site by a user. This metadata can be embedded in a web site in a manner such that the metadata is accessible to the computer 102, the application program 106, and/or the media sharing module 108. Thus, the operation 404 can include communicating with a social networking site or service to obtain the metadata.

The method 400 proceeds to operation 406, wherein the computer 102, the application program 106, and/or the media sharing module 108 queries a data storage device to determine if the computer has access to a copy of the media content corresponding to the shared metadata. In some embodiments, the data storage device includes a media library associated with the computer 102. Thus, the operation 406 can include interrogating or querying the media library to determine if the media content corresponding to the shared metadata, and/or a copy thereof, is locally accessible to the computer 102. It should be understood that the computer 102, the application program 106, and/or the media sharing module 108 can query a media playback application, and the media playback application can query the media library and/or access a web service to verify legal rights to the media content corresponding to the shared metadata, if desired.

The method 400 proceeds to operation 408 wherein the computer 102 determines if a copy of the media content corresponding to the shared metadata was located in operation 406. If a copy of the media content corresponding to the shared metadata was located, the method 400 proceeds to operation 410, wherein the copy of the media content is utilized for a user of the computer 102. An exemplary embodiment of operation 410 is illustrated in FIG. 2D and described above with reference thereto. It should be understood that if the computer 102, the application program 106, and/or the media sharing module 108 determines that a copy of the media content corresponding to the shared metadata is accessible, the operation 410 can include launching a stand-alone media playback application, web browser, digital reader, or another media content application for playback, access, or other utilization of the media content corresponding to the shared metadata.

Returning briefly to operation 408, if a copy of the media content corresponding to the shared metadata is not located, the method 400 proceeds to operation 412, wherein the application program 106, the media sharing module 108, and/or a media playback device generates media content access options for presentation to the user. For example, the application program 106, the media sharing module 108, and/or the media playback application can display to the user a control to purchase the media content corresponding to the shared metadata, a control to preview the media content corresponding to the shared metadata, a control to browse a local and/or remote data storage device to locate a copy of the media content corresponding to the shared metadata, a control to exit or cancel a request to play the media content corresponding to the shared metadata, other controls, and the like, as illustrated and described above with reference to the screen display 200E illustrated in FIG. 2E. As mentioned above, additional and/or alternative controls can be generated in association with the operation 412 described herein.

The method 400 proceeds to operation 414, wherein the options generated in the operation 412 can be presented to a user for selection. An exemplary embodiment of the functionality of operation 414 is illustrated and described above with reference to the screen display 200E illustrated in FIG. 2E, though additional and/or alternative functionality is possible and is contemplated. The method 400 ends.

Although not illustrated in FIG. 4, it should be understood that a user can select a presented option, and that additional functionality can be provided based upon the choice of the user. For example if the user selects a control to purchase the media content corresponding to the shared metadata, the computer 102 can launch a program to access a purchase mechanism or application.

Figure 5:
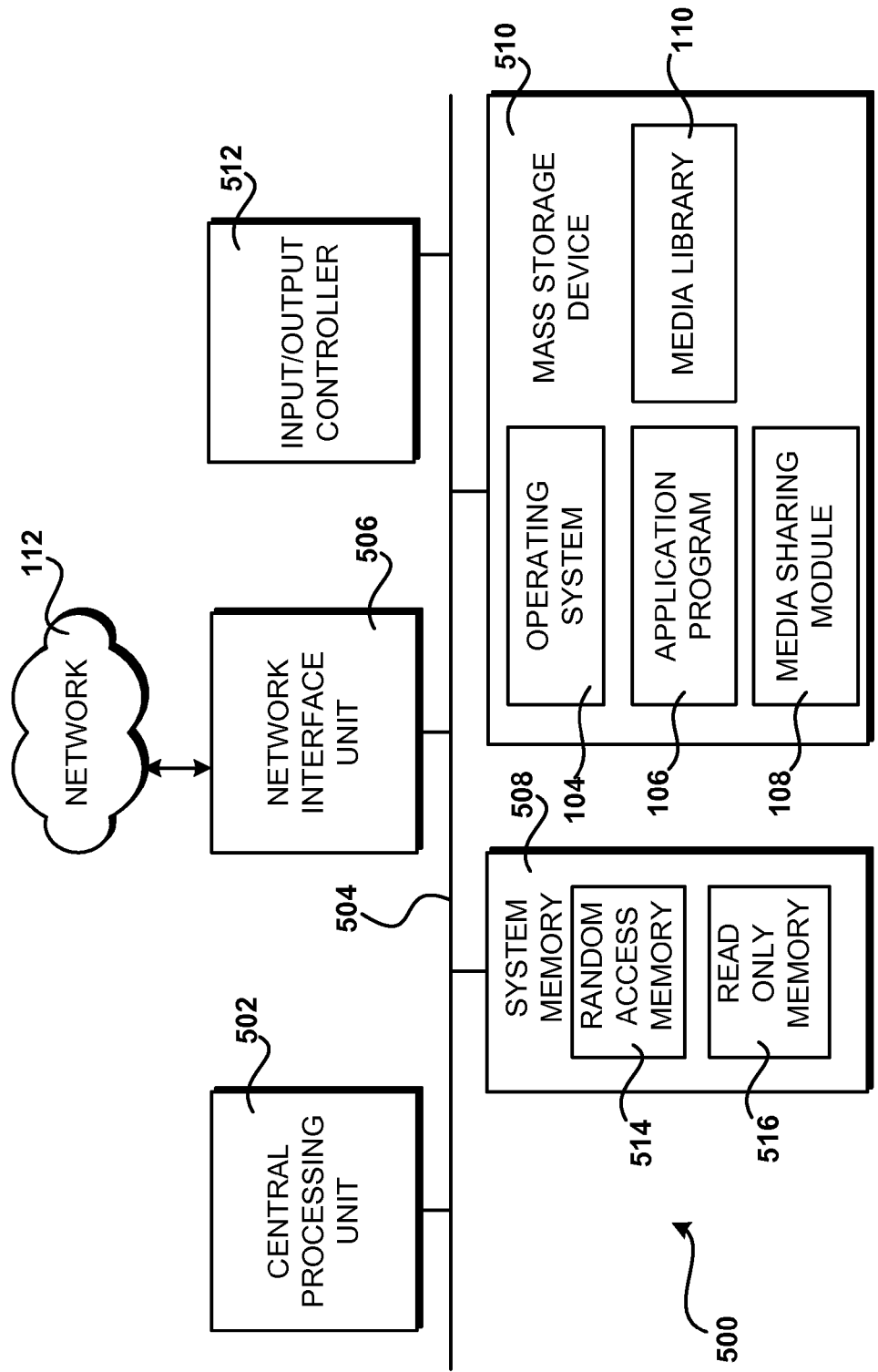
FIG. 5 is a computer architecture diagram illustrating an exemplary computer hardware and software architecture for a computing system capable of implementing aspects of the embodiments presented herein.

FIG. 5 illustrates an exemplary computer architecture 500 for a computer 102 capable of executing the software components described herein for providing media content metadata sharing as described above. The computer architecture 500 illustrated in FIG. 5 illustrates a conventional desktop, laptop, and/or server computer, and may be utilized to execute any aspects of the software components presented herein.

The computer architecture 500 shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer architecture 500, such as during startup, is stored in the ROM 516. The computer architecture 500 further includes a mass storage device 510 for storing an operating system 104, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 112. The computer architecture 500 may connect to the network 112 through a network interface unit 506 connected to the bus 504. It should be appreciated that the network interface unit 506 also may be utilized to connect to other types of networks and remote computer systems. The computer architecture 500 also may include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer architecture 500, including an operating system 104 suitable for controlling the operation of a networked desktop, laptop, or server computer. The mass storage device 510 and RAM 514 also may store one or more program modules. In particular, the mass storage device 510 and the RAM 514 may store the media sharing module 108 and the application program 106, each of which was described in detail above with respect to FIGS. 1-4. The mass storage device 510 and the RAM 514 also may store other types of program modules and data.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

The word "utilize," as used in the claims, is used broadly to refer to displaying, playing, performing, or otherwise accessing media content. Thus, while the claims refer to "utilizing" media content, it should be understood that the claims include all embodiments disclosed herein. As such, "utilizing" media content includes playback of audio content, displaying documents, playing video, and other embodiments described herein. Similarly, the word "obtain" as used in the claims refers to transmitting payment for a license, downloading data, purchasing content, accessing content, sampling or previewing content, and/or the like, and is not used to narrowly refer only to retrieving or receiving media content.

Although not described in detail above, it should be understood that a microphone or network connection can be accessed by the computer 102, the application program 106, and/or the media sharing module 108 to obtain media information associated with media being accessed or played by a device other than the computer 102 or an application being run by the computer 102. For example, a microphone of the computer 102 can be accessed by the computer 102, the application program 106, and/or the media sharing module 108 to obtain an audio signal. If the audio signal includes media such as, for example, music, the audio signal can be evaluated to identify the music or other media content.

For example, the audio signal can be transmitted to a web service such as, for example, SHAZZAM, or the like, for identification. The web service can return metadata to the computer 102, or an application or module thereof, and can be used to identify the media content. Similarly, the computer 102, the application program 106, and/or the media sharing module 108 can access a media playback application running at a network computer, and can obtain metadata or information associated with media content being utilized or otherwise accessed by the network computer in a manner substantially similar to that described above with reference to FIG. 2B. For purposes of this disclosure, a network device can include a device in wired and/or wireless communication with the computer 102.

Based on the foregoing, it should be appreciated that technologies for providing media sharing have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented system for accessing media content shared with a social network, the computer-implemented system comprising:
    a processor; and
    a computer-readable storage medium having instructions stored thereupon which, when executed by the processor, cause the processor to
        receive a request from a first user of the social network to access shared media content associated with a second user of the social network,
        in response to receiving the request, obtain information identifying the shared media content and initiate a search of a data storage device local to a computer associated with the first user for determining whether the data storage device has an authorized copy of the shared media content stored thereupon, the search being based upon the information identifying the shared media content,
        determine that the data storage device has the authorized copy of the shared media content stored thereupon,
        cause one or more user interface controls to be provided for utilizing the shared media content on the data storage device local to the computer associated with the first user in response to determining that the data storage device has the authorized copy of the shared media content stored thereupon,
        determine that the data storage device does not have the authorized copy of the shared media content stored thereupon, and
        cause one or more user interface controls to be provided for obtaining the authorized copy of the shared media content in response to determining the data storage device does not have the authorized copy of the shared media content stored thereupon.

2. The computer-implemented system of claim 1, wherein obtaining the information comprises retrieving metadata associated with the shared media content.

3. The computer-implemented system of claim 1, wherein the processor is further configured to cause a media playback application to utilize the shared media content.

4. The computer-implemented system of claim 1, wherein causing the one or more user interface controls to obtain the authorized copy of the shared media content to be provided comprises:
    causing a user interface for purchasing the authorized copy of the shared media content to be displayed;
    receiving a request through the user interface to initiate a purchase of the authorized copy of the shared media content; and
    in response to receiving the request, causing an application to complete the purchase of the authorized copy of the shared media content.

5. The computer-implemented system of claim 1, wherein causing the one or more user interface controls to obtain the authorized copy of the shared media content further comprises providing a user interface to preview the authorized copy of the shared media content.

6. The computer-implemented system of claim 1, wherein the processor is further configured to:
    in response to determining that the data storage device local to the computer associated with the first user does not store an authorized copy of the shared media content, initiate a search of a data storage device remote to the computer associated with the first user for determining whether the data remote storage device stores an authorized copy of the shared media content, the search being based upon the information identifying the shared media content; and
    cause one or more user interface controls to be provided for utilizing the shared media content in response to determining that the remote data storage device stores the authorized copy of the shared media content.

7. A computer-implemented method for accessing media content shared with a social network, the computer-implemented method comprising performing computer-implemented operations for:
    sending, from the social network to a user, a command to utilize shared media content;
    obtaining information identifying the shared media content and initiating a search of a data storage device local to a computer associated with the first user for determining whether the data storage device stores an authorized copy of the shared media content, the search being based upon the information identifying the shared media content;
    determining that the data storage device stores the authorized copy of the shared media content;
    providing a user interface control to utilize the shared media content on the data storage device local to the computer associated with the first user in response to determining that the data storage device stores the authorized copy of the shared media content;
determining the data storage device does not store the authorized copy of the shared media content; and
providing a user interface control to obtain the authorized copy of the shared media content in response to determining the data storage device does not store the authorized copy of the shared media content.

8. The computer-implemented method of claim 7, wherein obtaining the information comprises retrieving metadata associated with the shared media content.

9. The computer-implemented method of claim 7, wherein initiating the search comprises:
generating a query for searching the data storage device; and
submitting the query to an application to determine if the data storage device stores the authorized copy of the shared media content.

10. The computer-implemented method of claim 9, wherein generating the query comprises generating a query for searching a media library associated with a playback application, the media library being stored at the data storage device.

11. The computer-implemented method of claim 7, further comprising causing a media playback application to utilize the shared media content.

12. The computer-implemented method of claim 7, further comprising causing an electronic book reading application to display the shared media content.

13. The computer-implemented method of claim 7, wherein providing a user interface control to obtain the authorized copy of the shared media content further comprises:
causing a user interface for purchasing the authorized copy of the shared media content to be displayed;
receiving a request through the user interface to purchase the authorized copy of the shared media content; and
causing an application to complete the purchase the authorized copy of the shared media content in response to receiving the request.

14. The computer-implemented method of claim 7, wherein providing a user interface control to obtain the authorized copy of the shared media content further comprises initiating a user interface to preview the authorized copy of the shared media content.

15. The computer-implemented method of claim 7, further comprising:
in response to determining that the data storage device local to the computer associated with the first user does not store an authorized copy of the shared media content, initiate a search of a data storage device remote to the computer associated with the first user for determining whether the remote data storage device stores an authorized copy of the shared media content, the search being based upon the information identifying the shared media content; and
providing a user interface control to utilize the shared media content in response to determining that the remote data storage device stores the authorized copy of the shared media content.

16. An optical disk, magnetic storage device, or solid state storage device having executable instructions stored thereupon which, when executed by a computer, cause the computer to:
receive a request from a first user of a social network to access shared media content associated with a second user of the social network;
in response to receiving the request,
retrieve metadata associated with the shared media content, and
determine whether the data storage device stores an authorized copy of the shared media content, by
generating a query for searching a data storage device local to a computer associated with the first user, the query being based upon the metadata associated with the shared media content, and
submitting the query to an application to determine if the data storage device stores the authorized copy of the shared media content;
cause one or more user interface controls to be provided for utilizing the shared media content on the data storage device local to the computer associated with the first user in response to determining that the data storage device stores the authorized copy of the shared media content;
determine the data storage device does not store the authorized copy of the shared media content; and
cause one or more user interface controls to be provided for obtaining the authorized copy of the shared media content in response to determining the data storage device does not store the authorized copy of the shared media content.

17. The optical disk, magnetic storage device, or solid state storage device of claim 16, wherein providing the user interface control to obtain the authorized copy of the shared media content comprises:
causing a user interface for purchasing the authorized copy of the shared media content to be displayed;
initiating through the user interface a purchase of the authorized copy of the shared media content; and
causing an application to complete the purchase the authorized copy of the shared media content.

18. The optical disk, magnetic storage device, or solid state storage device of claim 16, wherein generating the query comprises generating a query for searching a media library associated with a playback application, the media library being stored at the data storage device.

19. The optical disk, magnetic storage device, or solid state storage device of claim 16, comprising further computer-readable instructions which, when executed by the computer, cause the computer to cause a media playback application to utilize the shared media content.

20. The optical disk, magnetic storage device, or solid state storage device of claim 16, wherein providing a user interface control to obtain the authorized copy of the shared media content further comprises generating a control to preview the authorized copy of the shared media content.

\* \* \* \* \*